(12) United States Patent
Ahn et al.

(10) Patent No.: US 7,359,301 B2
(45) Date of Patent: Apr. 15, 2008

(54) METHOD OF AND APPARATUS FOR RECORDING DATA ON AN OPTICAL RECORDING MEDIUM

(75) Inventors: Yong-jin Ahn, Seoul (KR); In-sik Park, Gyeonggi-do (KR); Kyung-geun Lee, Gyeonggi-do (KR); Du-seop Yoon, Gyeonggi-do (KR); In-oh Hwang, Gyeonggi-do (KR); Jung-wan Ko, Gyeonggi-do (KR); Seong-sue Kim, Seoul (KR); Chang-jin Yang, Gyeonggi-do (KR); Tatsuhiro Otsuka, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 564 days.

(21) Appl. No.: 10/452,942

(22) Filed: Jun. 3, 2003

(65) Prior Publication Data

US 2004/0032808 A1    Feb. 19, 2004

(30) Foreign Application Priority Data

Jun. 3, 2002   (KR) ............................... 2002-31068

(51) Int. Cl.
*G11B 7/0045*   (2006.01)
(52) U.S. Cl. .................................. 369/59.11
(58) Field of Classification Search .. 369/59.11–59.12, 369/116
See application file for complete search history.

(56) References Cited

U.S. PATENT DOCUMENTS

| 5,109,373 | A | * | 4/1992 | Ohno et al. ............... 369/59.11 |
| 5,469,422 | A | | 11/1995 | Sohmuta |
| 6,104,685 | A | | 8/2000 | Saga et al. |
| 6,236,635 | B1 | | 5/2001 | Miyamoto et al. |
| 6,280,810 | B1 | * | 8/2001 | Nakamura et al. .......... 369/288 |
| 6,281,815 | B1 | | 8/2001 | Shim et al. |
| 6,396,792 | B1 | | 5/2002 | Ichihara |
| 6,411,579 | B2 | * | 6/2002 | Nobukuni et al. ....... 369/59.12 |
| 6,600,709 | B2 | | 7/2003 | Dekker |
| 2002/0067673 | A1 | * | 6/2002 | Ko et al. ................. 369/53.21 |

FOREIGN PATENT DOCUMENTS

CN   1186297 A   7/1998

(Continued)

OTHER PUBLICATIONS

Shigeru Furiyama et al., Optical Disk Recording System of 25GB Capacity, Optical Data Storage 2001 (SPIE 2002).

(Continued)

*Primary Examiner*—William Korzuch
*Assistant Examiner*—Nathan Danielsen
(74) *Attorney, Agent, or Firm*—Stein, McEwen & Bui, LLP

(57) ABSTRACT

A method of recording data on an optical recording medium includes forming a mark or a space using a recording waveform which includes a DC record pattern, and an erase pattern that includes a multi pulse. According to the method and an apparatus using the method, the distortion of a mark can be prevented and the shape of a mark can be improved, thereby increasing recording/reproducing characteristics.

28 Claims, 16 Drawing Sheets

FOREIGN PATENT DOCUMENTS

| | | |
|---|---|---|
| EP | 0 405 610 | 1/1991 |
| JP | 01-253828 | 10/1989 |
| JP | 03-185628 | 8/1991 |
| JP | 05-143993 | 6/1993 |
| JP | 06-215375 | 8/1994 |
| JP | 7-105585 | 4/1995 |
| JP | 08-235587 | 9/1996 |
| JP | 09-231571 | 9/1997 |
| JP | 10-064065 | 3/1998 |
| JP | 10-241164 | 9/1998 |
| JP | 11-086291 | 3/1999 |
| JP | 2000-123367 | 4/2000 |
| JP | 2000-149262 | 5/2000 |
| JP | 2000-222733 | 8/2002 |
| JP | 2003-533836 | 11/2003 |
| KR | 2000-0067781 | 11/2000 |
| WO | WO 01/86642 | 11/2001 |

OTHER PUBLICATIONS

"Modulation and Coding for Information Storage", Paul H. Siegel et al., IEEE Communications Magazine, Dec. 1991, pp. 68-86.

European Search Report issued in European Application No. 03253324.2 on Nov. 29, 2006.

* cited by examiner

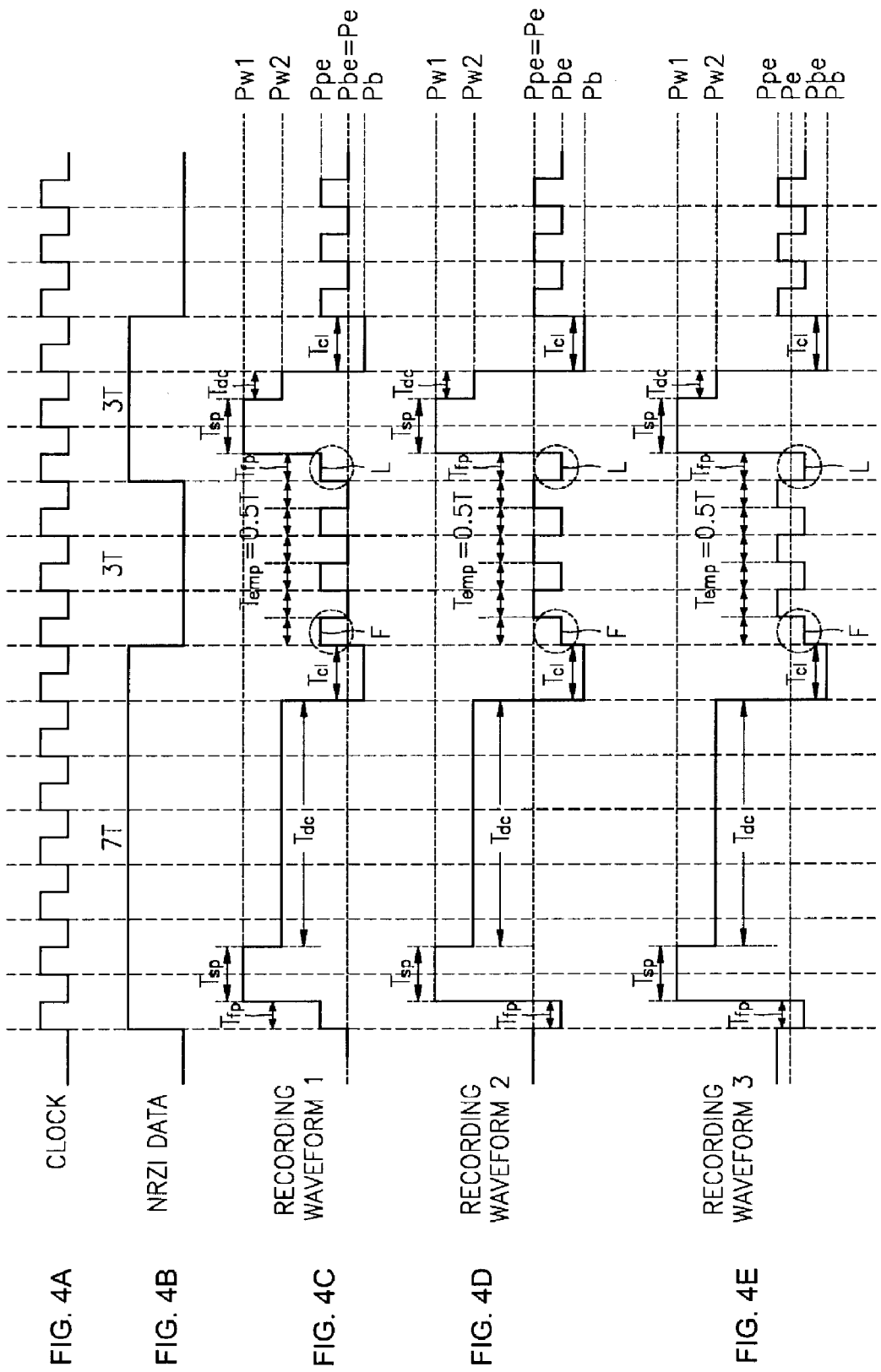

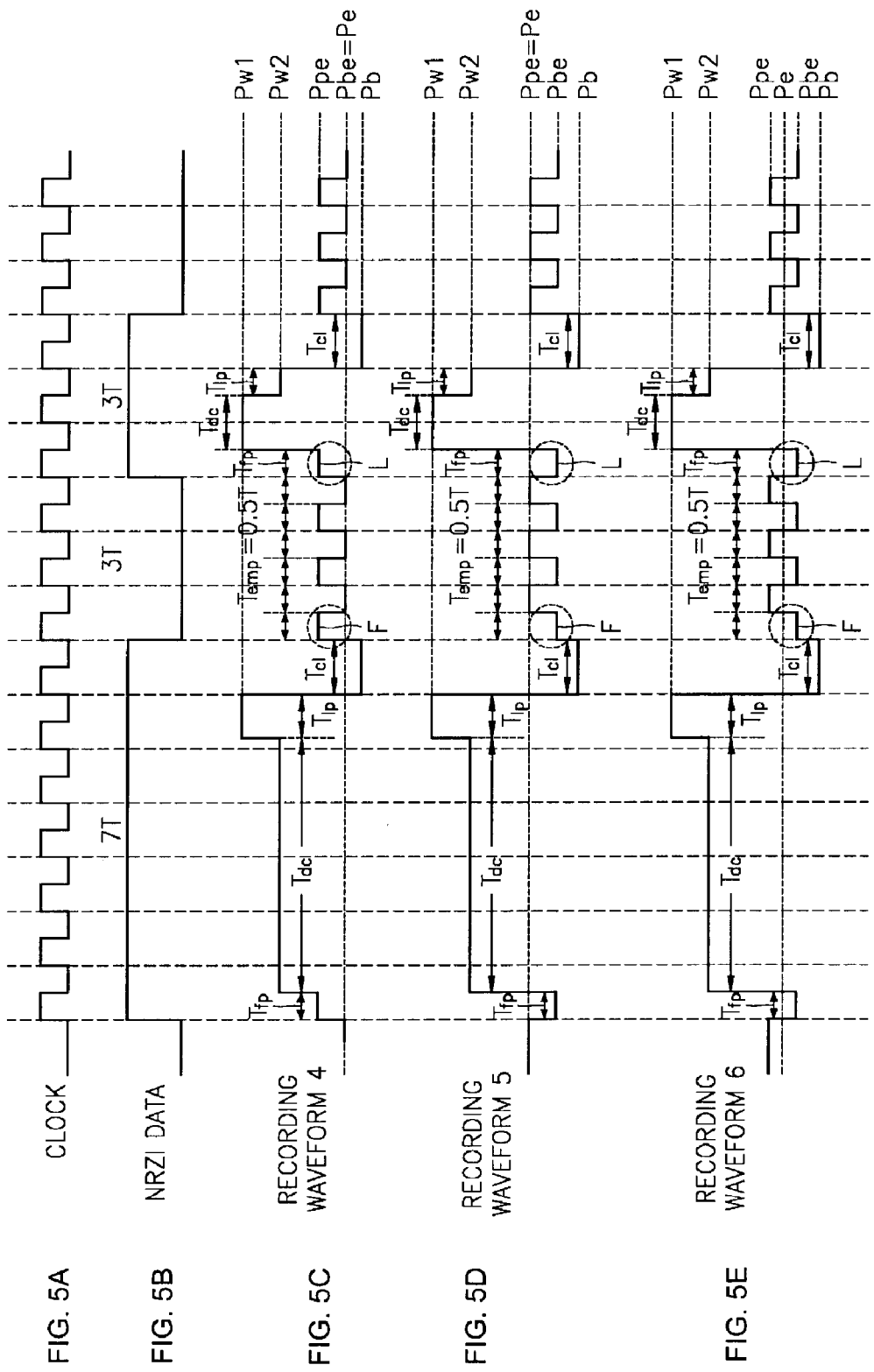

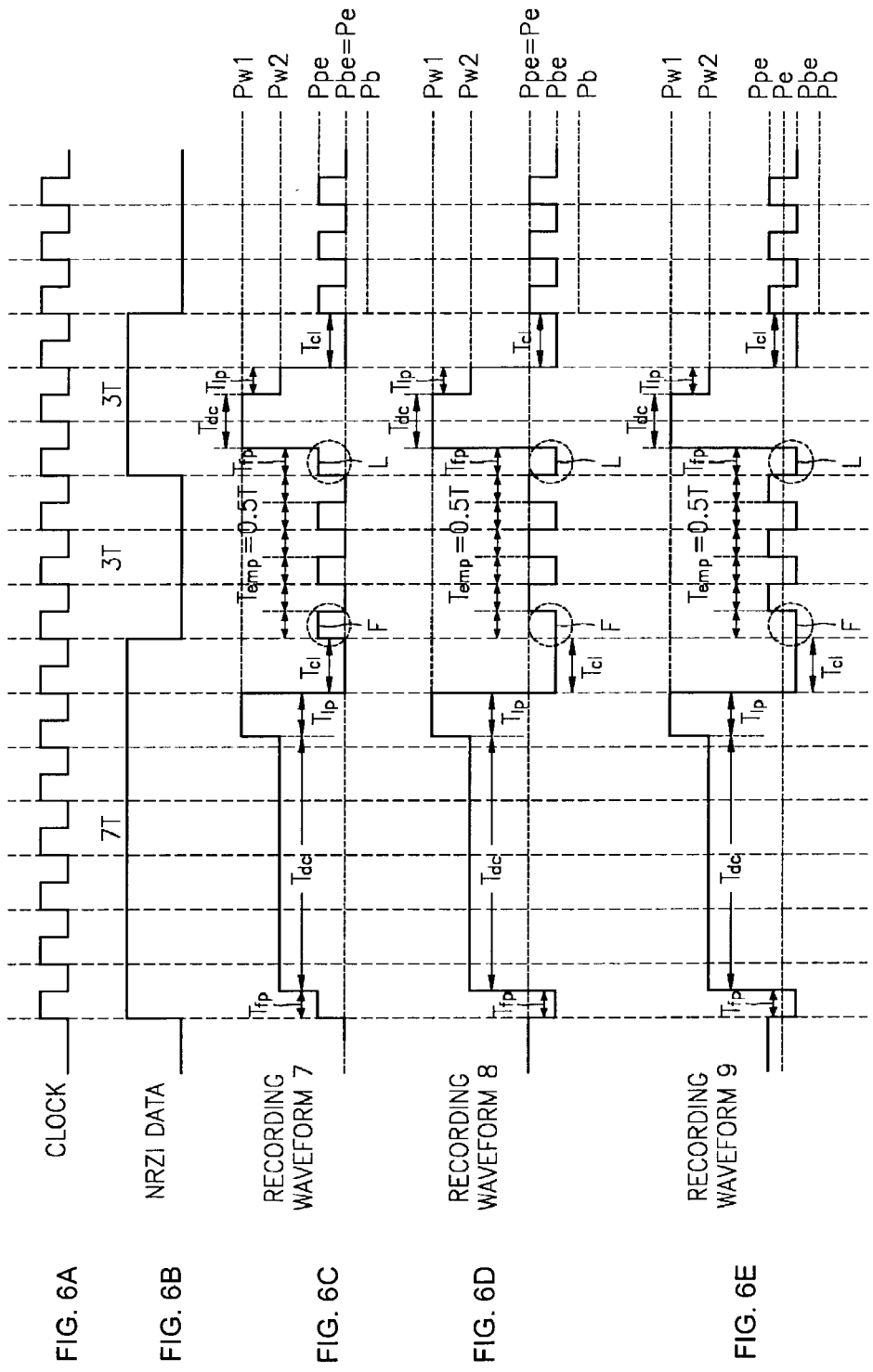

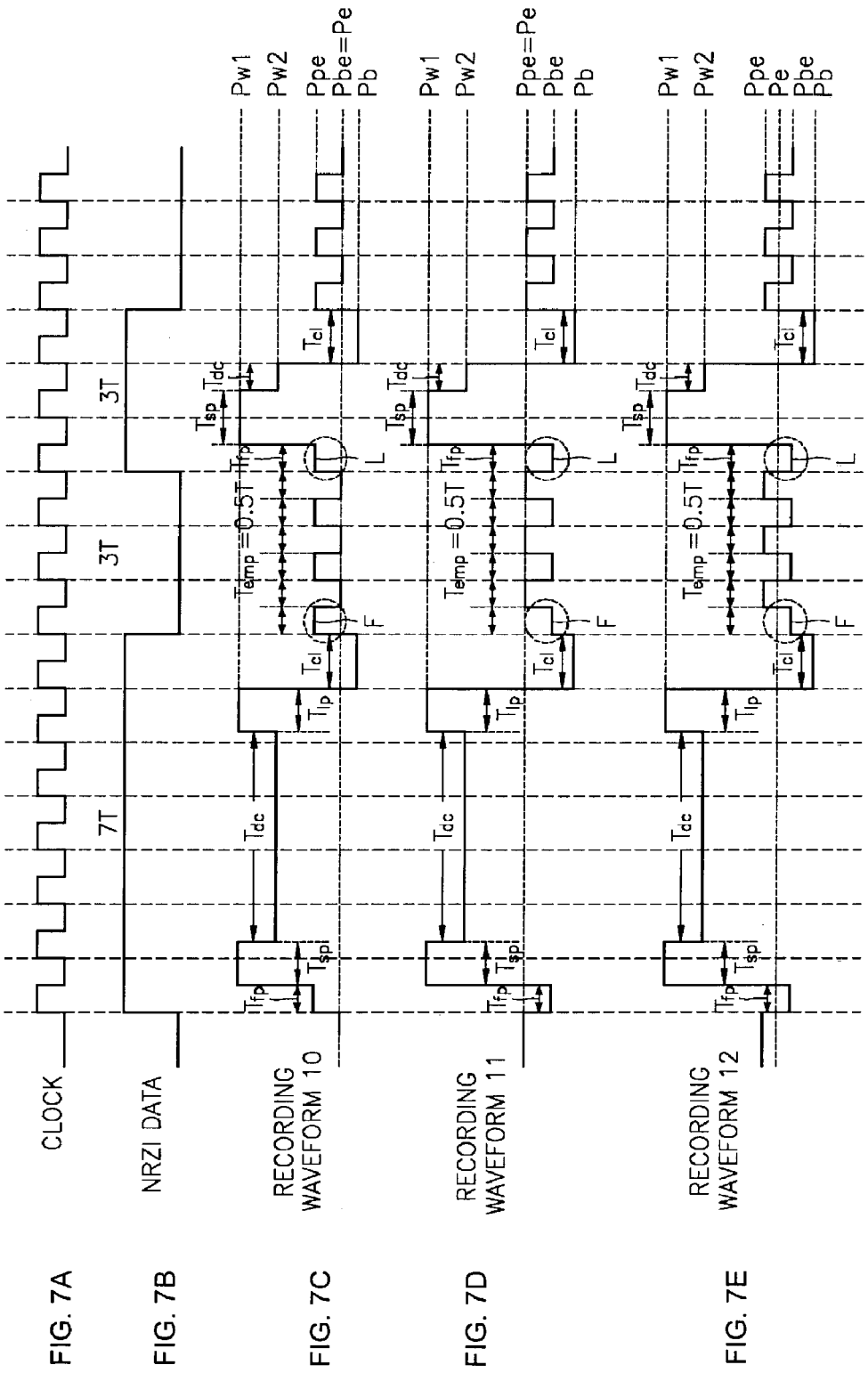

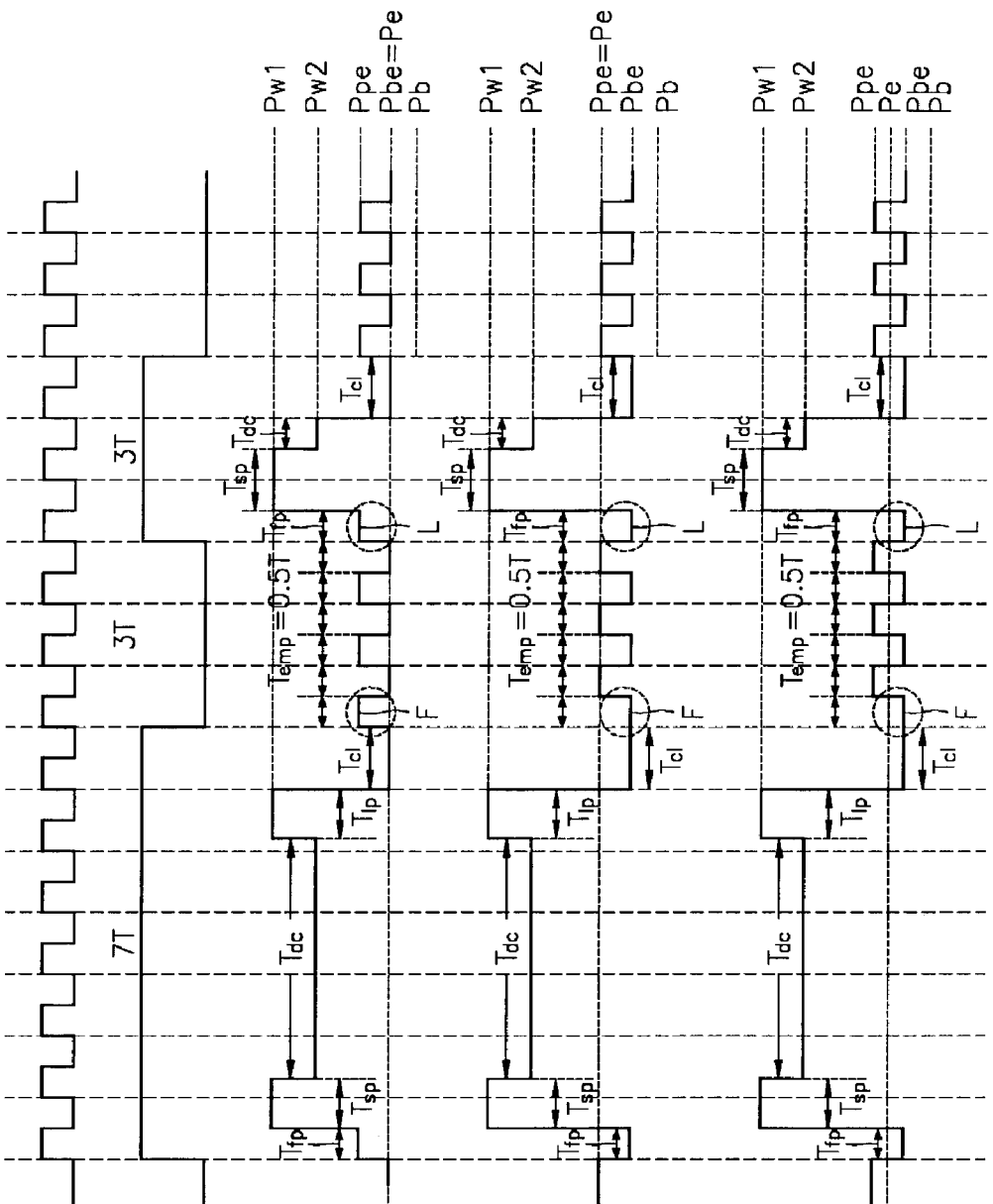

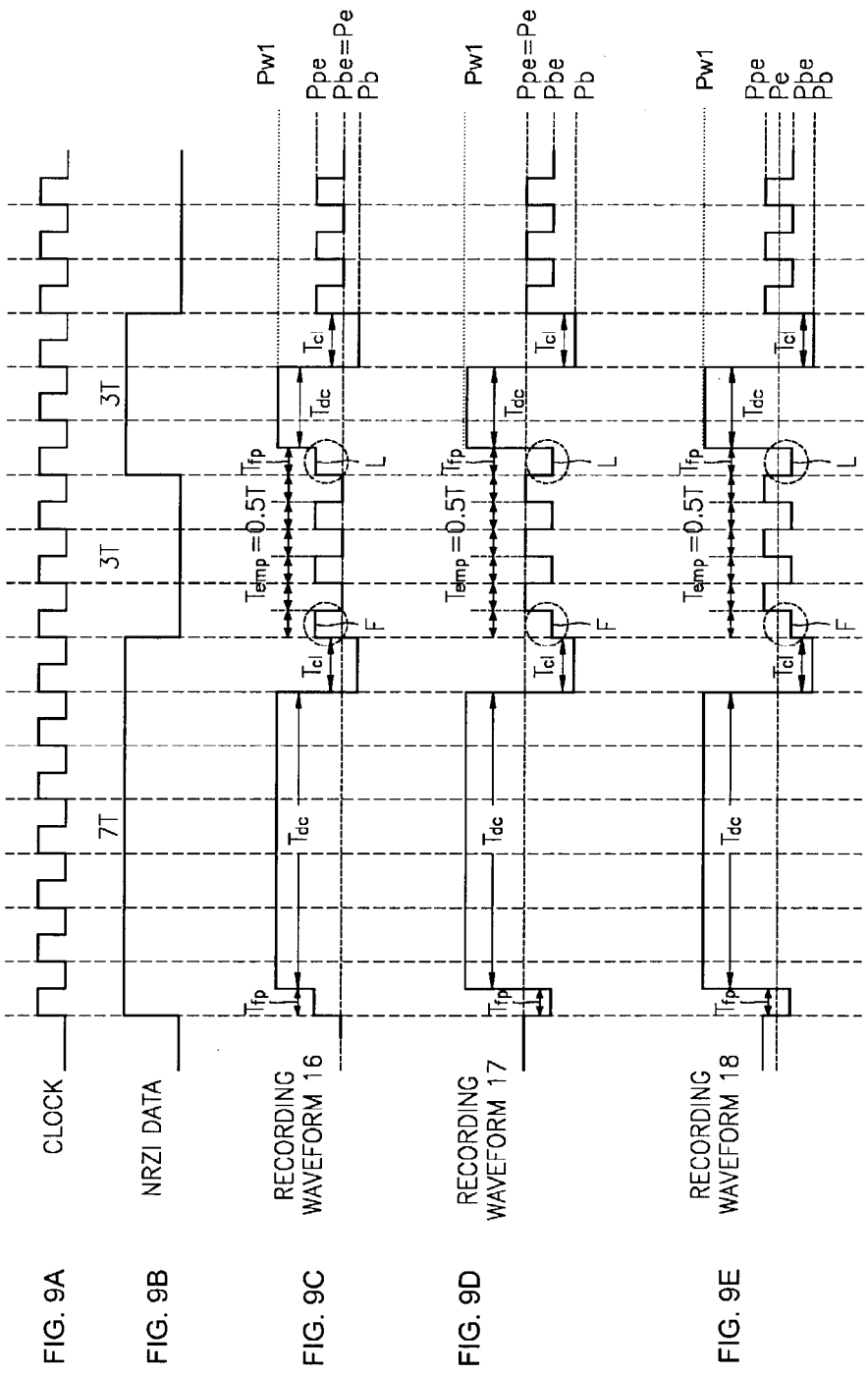

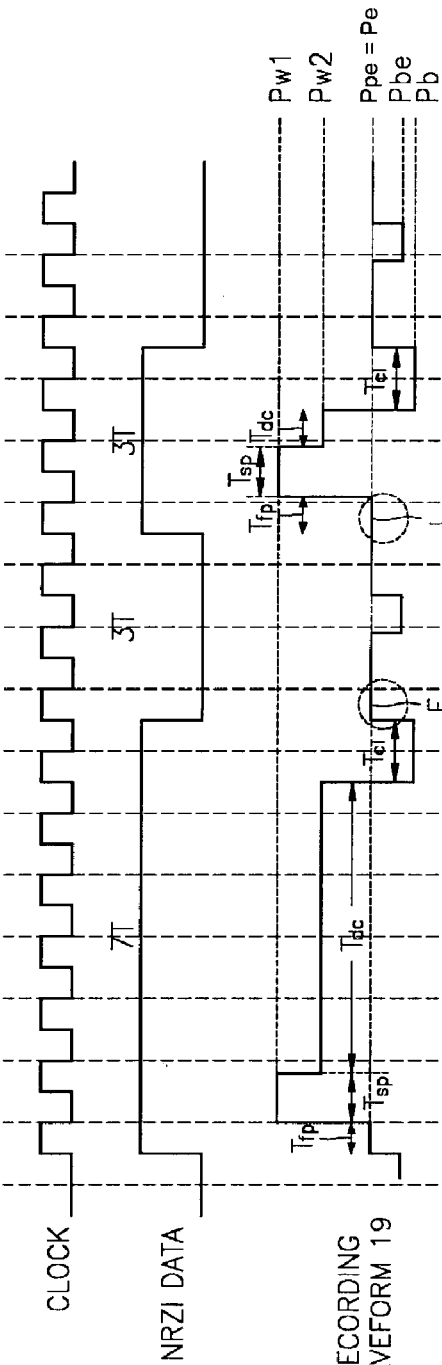
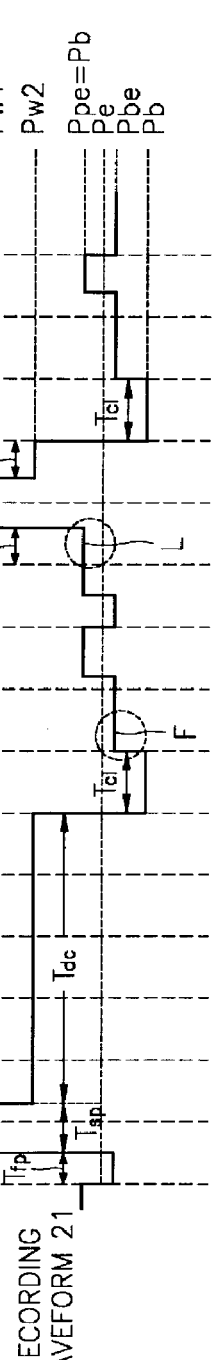
FIG. 10A CLOCK
FIG. 10B NRZI DATA
FIG. 10C RECORDING WAVEFORM 19
FIG. 10D RECORDING WAVEFORM 20
FIG. 10E RECORDING WAVEFORM 21

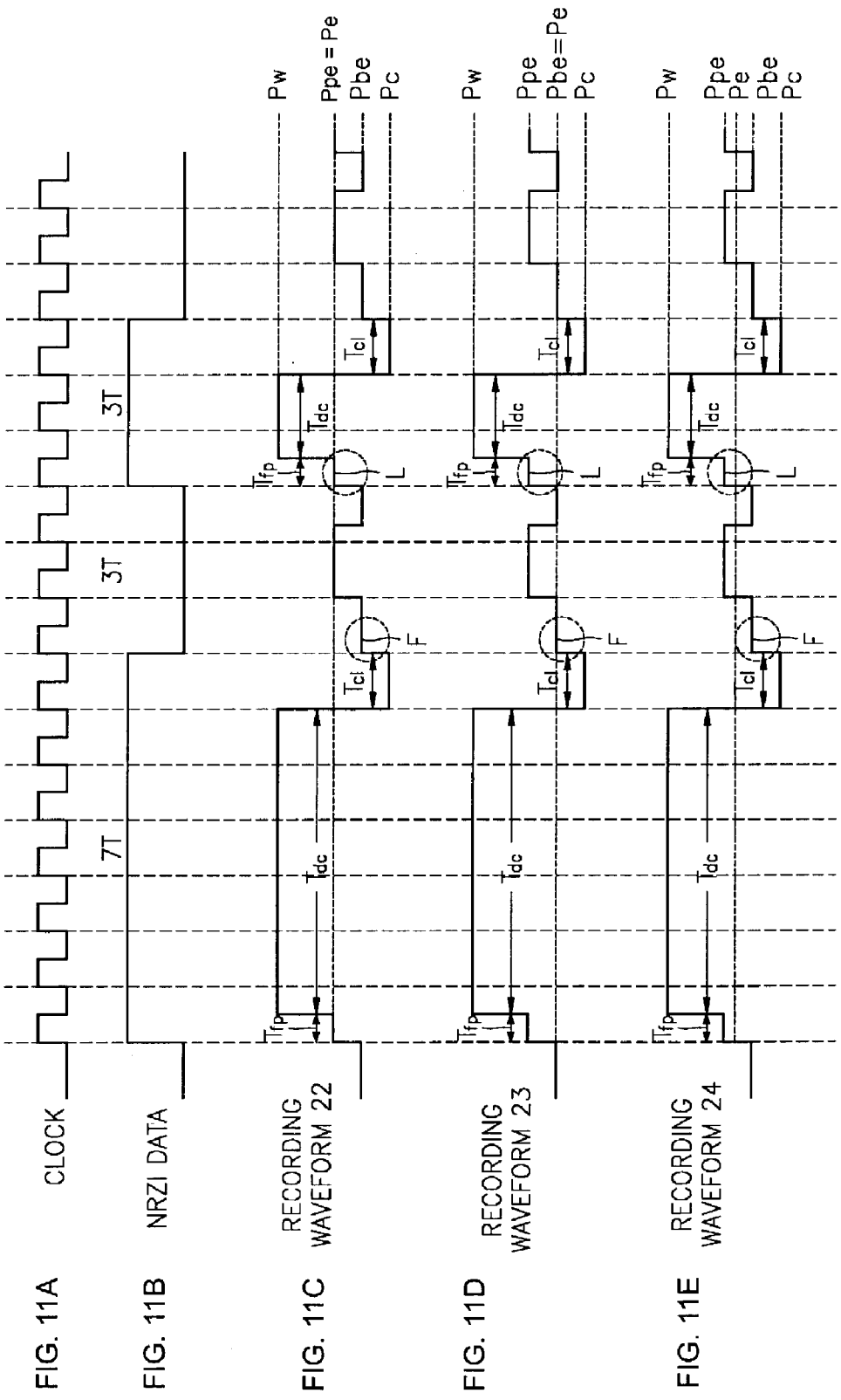

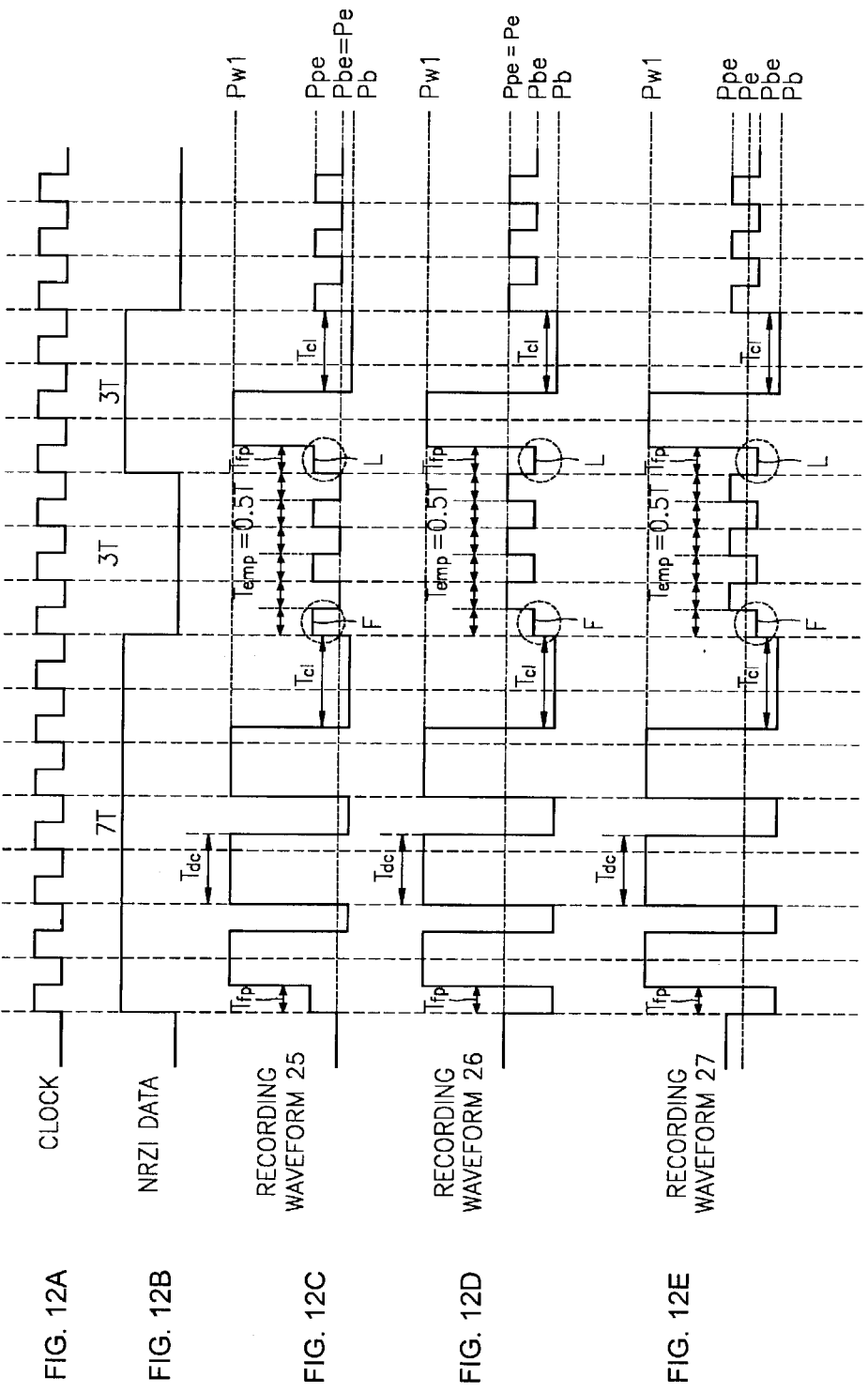

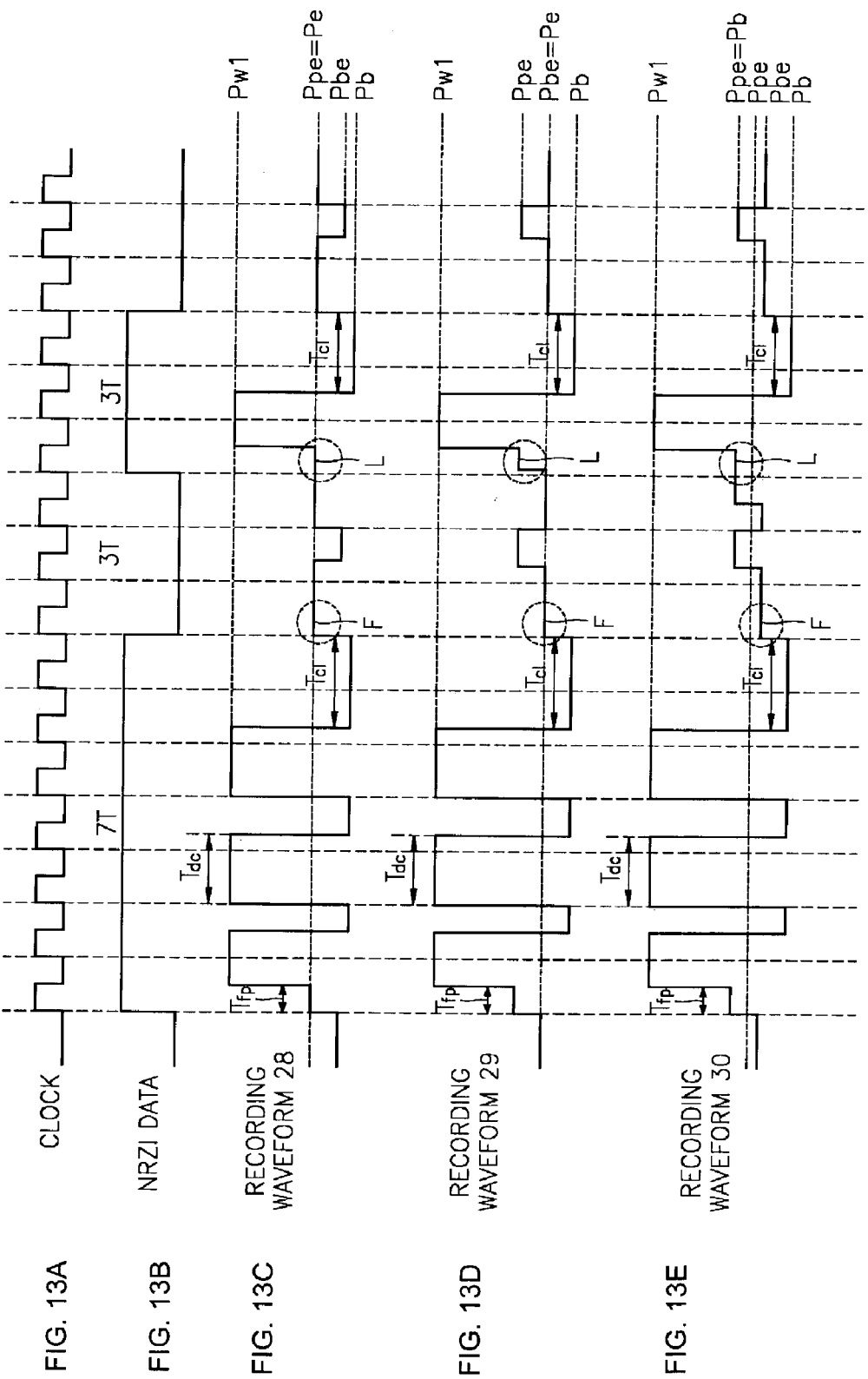

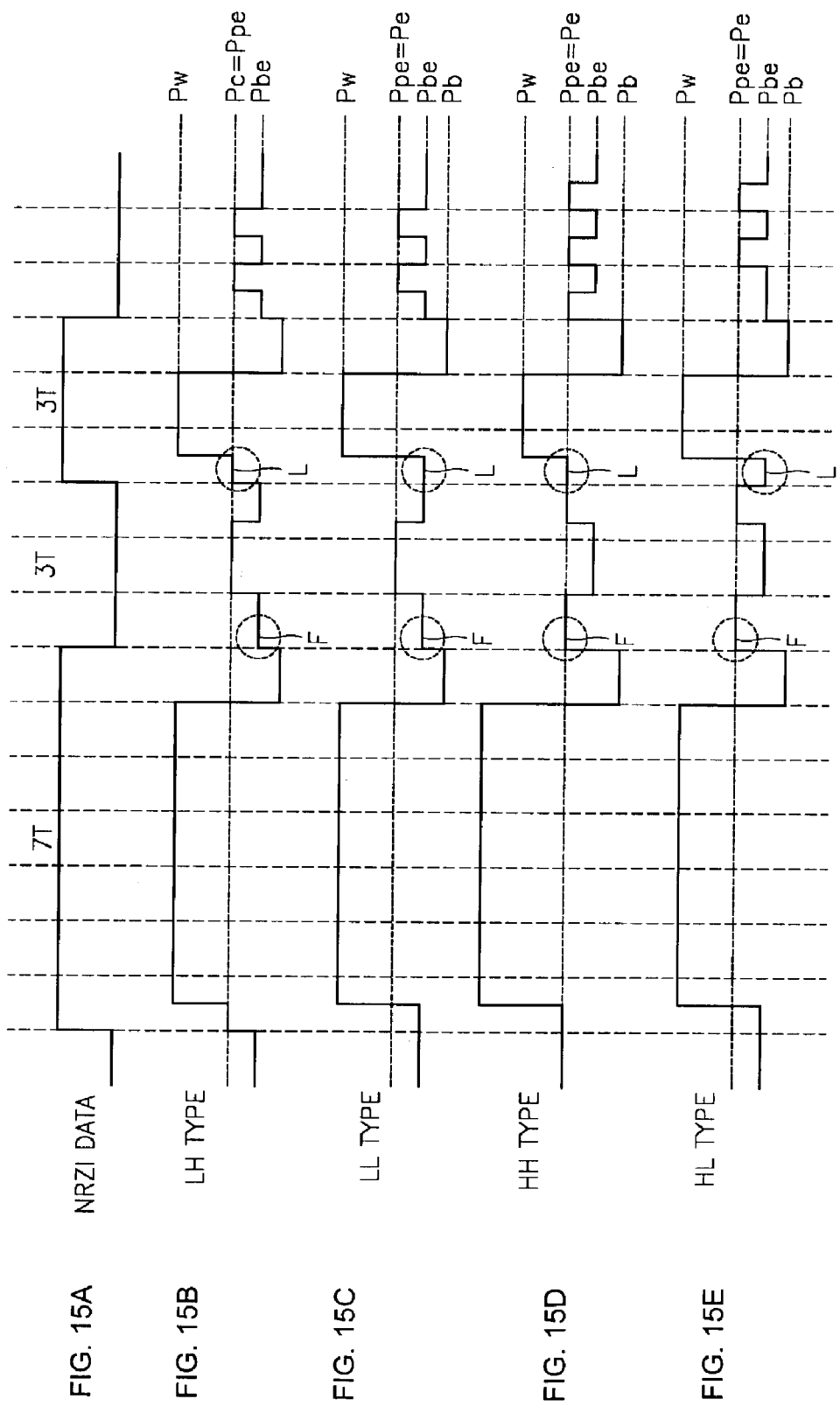

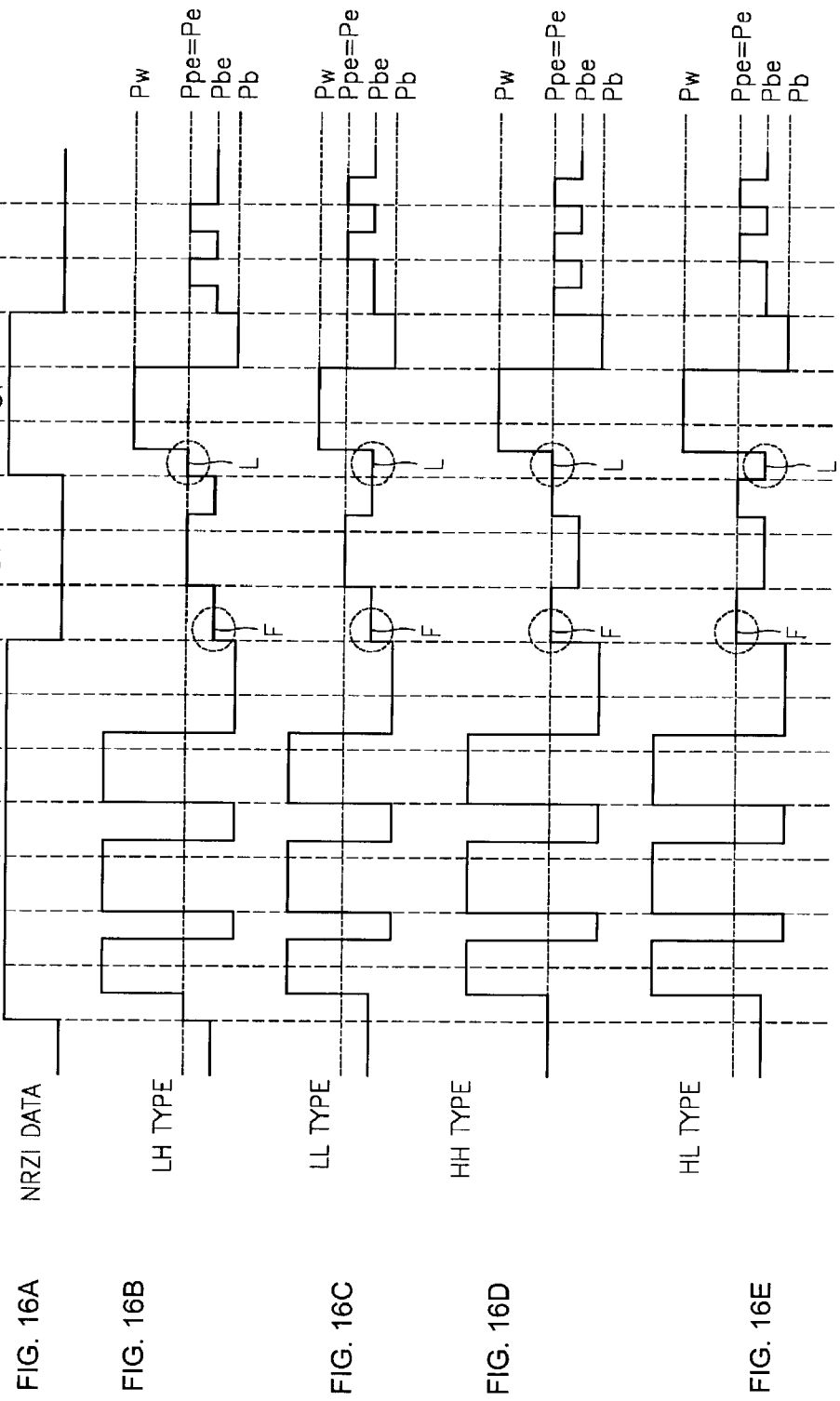

METHOD OF AND APPARATUS FOR RECORDING DATA ON AN OPTICAL RECORDING MEDIUM

CROSS-REFERENCE TO RELATED APPLICATION

This application claims the benefit of Korean Patent Application No. 2002-31068, filed Jun. 3, 2002 in the Korean Intellectual Property Office, the disclosure of which is incorporated herein in its entirety by reference.

BACKGROUND OF THE INVENTION

1. Field of the Invention

The present invention relates to a method of and apparatus for recording data on an optical recording medium, and more particularly, to a method of and apparatus for recording channel-modulated digital data on an optical disc by forming a mark or a space thereon.

2. Description of the Related Art

In general, data is recorded on an optical disc, which is one type of optical recording media, by forming a mark or a space on a target track of the optical disc. In the case of read-only discs such as CD-ROMs and DVD-ROMs, the mark or the space is formed as a pit. In the case of a writable disc such as CD-R/RW or DVD-R/RW/RAM, a recording layer is coated with a phase change material whose properties change into crystalline or amorphous crystalline according to temperature. By using such characteristics of the phase change material, the mark or the space is formed on a writable disc.

Data recording methods using signal detection are divided into a mark edge recording method and a mark position recording method. The mark position recording method uses the amplitude of a detected radio-frequency (RF) signal change from a positive/negative value to a negative/positive value, starting from the position of the mark. In contrast, the mark edge recording method uses a feature in which the amplitude of a detected RF signal changes from a positive/negative value to a negative/positive value in order to start from the both edges of a mark. Thus, the edge of the mark must be precisely recorded on the target track of an optical medium so as to improve the quality of a reproduction signal.

However, in an optical disc having the phase change film, the shape of the trailing edge of a mark, which is recorded by such a conventional recording method, depends on the length of the mark or an interval between adjacent marks (i.e., the length of the space). For instance, the size of the trailing edge of a mark may be larger than that of its leading edge, thereby deteriorating the recording/reproducing characteristics of the optical disc. The recording/reproducing characteristics become much worse because heat is accumulated in the edge of a mark when a recording mark is comparatively long.

FIGS. 1A through 1C illustrate a conventional recording waveform for recording non-return-to-zero-inverted (NRZI) data on a DVD+RW. Here, T denotes a period of a reference clock. In the mark edge recording method, high and low levels of the NRZI data are recorded as the mark and the space, respectively. A recording waveform for recording a mark and a recording waveform for recording a space (for erasing the mark) are called a record pattern and an erase pattern, respectively. A conventional recording waveform includes the record pattern, the record pattern being a multi pulse having a plurality of unit pulses that are maintained at the same power levels for the same time, and includes the erase pattern that is maintained at a predetermined DC level for a predetermined duration.

Specifically, the erase pattern included in the conventional recording waveform is maintained at a predetermined DC level for a predetermined time, resulting in the continuous heating of an area of an optical disc where the erase pattern is recorded, at a temperature between 0° C. and 200° C. If the erase pattern is repeatedly recorded a predetermined number of times, the quality of the optical disc deteriorates. Thus, the mark recorded on the optical disc distorts, thereby remarkably lowering the recording/reproducing characteristics of the optical disc.

In particular, the recording/reproducing characteristics deteriorate to a great extent when a period T of a reference clock becomes shorter and the thermal interference between pulses of a recording waveform increases as the recording density and linear velocity of an optical disc are increased so as to record much more data. Further, when the conventional record pattern has a multi-pulse, the amount of power supplied to record the mark may decrease to distort the mark when data is recoded on an optical disc at a high speed so as to increase the transmission speed of data (i.e., when the period T of the reference clock decreases).

SUMMARY OF THE INVENTION

The present invention provides a recording method and apparatus that uses a recording waveform which prevents the distortion of leading and trailing edges of a mark and the deterioration of an optical disc caused by repetitive recording.

The present invention also provides a recording method and apparatus that use a recording waveform having an erase pattern that improves the shape of a mark.

The present invention also provide a recording method and apparatus that uses a recording waveform having a record pattern that improves the shape of a mark even when recording data at a high speed.

Additional aspects and/or advantages of the invention will be set forth in part in the description which follows and, in part, will be obvious from the description, or may be learned by practice of the invention.

According to an aspect of the present invention, a method of recording data on an optical recording medium includes forming a mark or a space using a recording waveform which includes a DC record pattern and an erase pattern, where the erase pattern includes a multi pulse.

It is preferable, but not required, that the forming the mark or the space comprises recording the data using run length limited (RLL) (2, 10) encoding, and a first level and a second level of non-return-to-zero-inverted (NRZI) data are recorded as a mark and a space, respectively.

According to another aspect of the present invention, a method of recording data on an optical recording medium includes producing channel-modulated digital data; producing a recording waveform which includes a DC record pattern, and an erase pattern that includes a multi pulse; and forming a first level and a second level of channel-modulated digital data as a mark and a space using the recording waveform, respectively.

According to yet another aspect of the present invention, a method of recording data on an optical recording medium includes producing channel-modulated digital data; producing a recording waveform which includes an erase pattern that includes a modified multi pulse; and forming a first level and a second level of channel-modulated digital data as a mark and a space using the recording waveform, respectively.

According to another aspect of the present invention, a method of recording data on an optical recording medium includes producing channel-modulated digital data; producing a recording waveform which includes a modified DC record pattern, and an erase pattern that includes a modified multi pulse; and forming a first level and a second level of channel-modulated digital data as a mark and a space using the recording waveform, respectively.

It is preferable, but not required, that the power level of first and last erase pulses of the erase pattern is the same as a low power level and a high power level of the multi pulse or the modified multi pulse, respectively.

According to an aspect of the invention, the power level is the same as a high power level of the multi pulse or the modified multi pulse.

According to an aspect of the invention, the power levels is the same as a low power level of the multi pulse or the modified multi pulse.

According to an aspect of the invention, the power level is the same as a high power level and a low power level of the multi pulse or the modified multi pulse, respectively.

It is preferable, but not required, that in the DC record pattern, a first record pulse with different power levels, a second record pulse, a DC pulse that is maintained at a predetermined power level, and a cooling pulse are sequentially generated.

It is preferable, but not required, that in the DC record pattern for recording the mark has a seven clock period duration and includes, sequentially, a first record pulse a different power level other than the power levels of the remaining record pulses, a second record pulse, a DC pulse, a last record pulse, and a cooling pulse, and in the DC record pattern for recording the mark has a three clock period and includes, sequentially, a first record pulse with a different power level than power levels of the remaining record pulses, a second record pulse, a DC pulse, and a cooling pulse.

It is preferable, but not required, that the DC pulse is maintained for more than four clock periods when recording the mark having the seven clock periods duration.

According to still another aspect of the present invention, an apparatus for recording data on an optical recording medium includes a recording waveform generator which generates a recording waveform that includes a DC record pattern or a modified DC record pattern, and an erase pattern that includes a multi pulse or a modified multi pulse; and a pickup which forms a mark or a space by illuminating a beam on the optical recording medium in accordance with the recording waveform.

BRIEF DESCRIPTION OF THE DRAWINGS

The above and/or other aspects and advantages of the present invention will become more apparent by describing in detail embodiments thereof with reference to the accompanying drawings in which:

FIGS. 4A through 12E illustrate recording waveforms generated by a recording waveform generating circuit of FIG. 3 according to embodiments of the present invention;

FIGS. 13A through 16E illustrate erase patterns according to embodiments of the present invention.

DETAILED DESCRIPTION OF THE EMBODIMENTS

Figure 1:
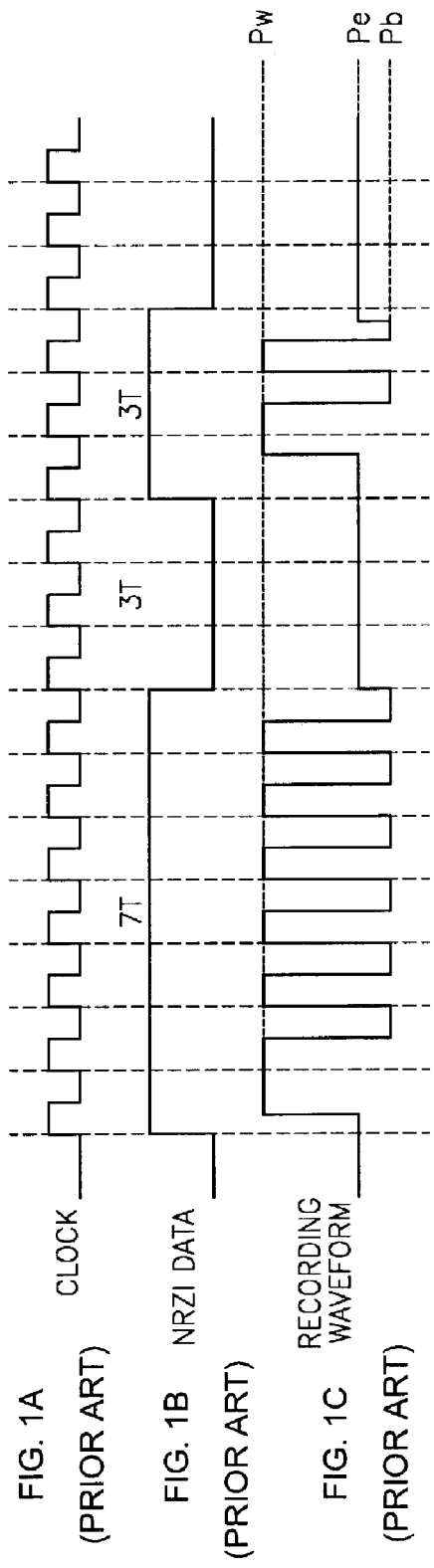
FIGS. 1A through 1C illustrate a conventional recording waveform.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
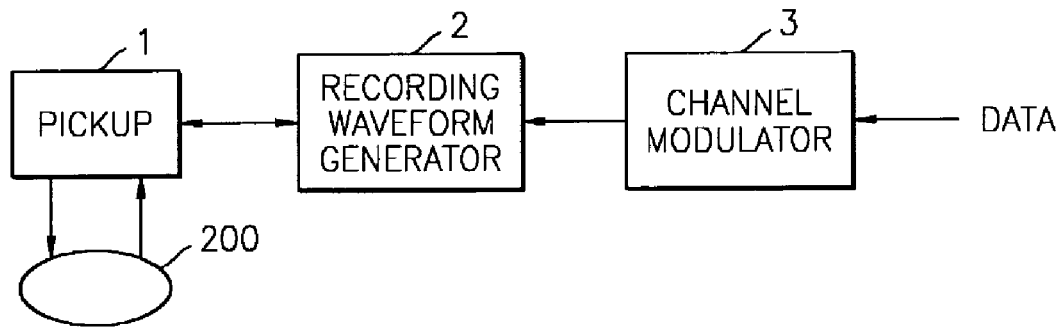
FIG. 2 is a block diagram illustrating the structure of a recording apparatus according to an embodiment of the present invention.

FIG. 2 is a block diagram illustrating the structure of a recording apparatus according to an embodiment of the present invention. The recording apparatus records data on an optical recording medium 200 by forming a mark or a space thereon. Referring to FIG. 2, the recording apparatus includes a pickup 1, a recording waveform generator 2, and a channel modulator 3. The channel modulator 3 modulates data input from the outside into a channel bit stream. The recording waveform generator 2 receives the channel bit stream and generates a recording waveform to record the channel bit stream. The generated recording waveform includes a DC record pattern with a DC pulse and an erase pattern with a multi pulse. The recording waveform will later be described in detail. The pickup 1 forms a mark or a space on the optical recording medium 200 by illuminating light thereon in accordance with the generated recording waveform. While not explicitly shown, a controller controls the operations of the pickup 1, the recording form generator 2, and the channel modulator 3.

Figure 3:
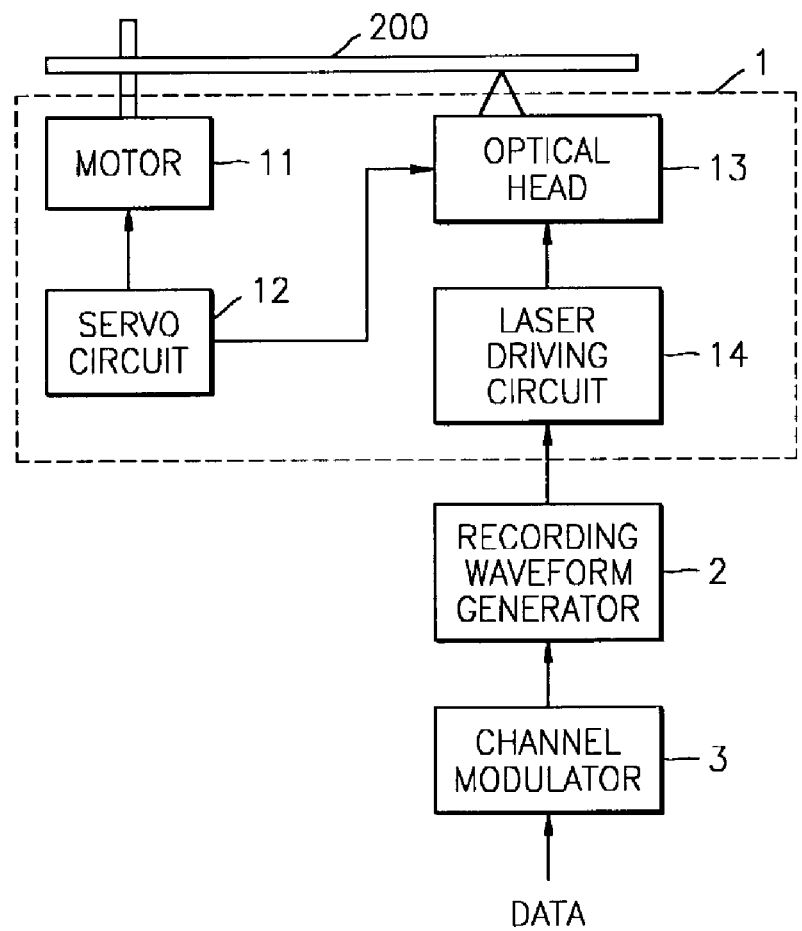
FIG. 3 is a detailed block diagram illustrating the structure of the recording apparatus of FIG. 2.
Figures 14A, 14B, 14C, 14D, 14E:
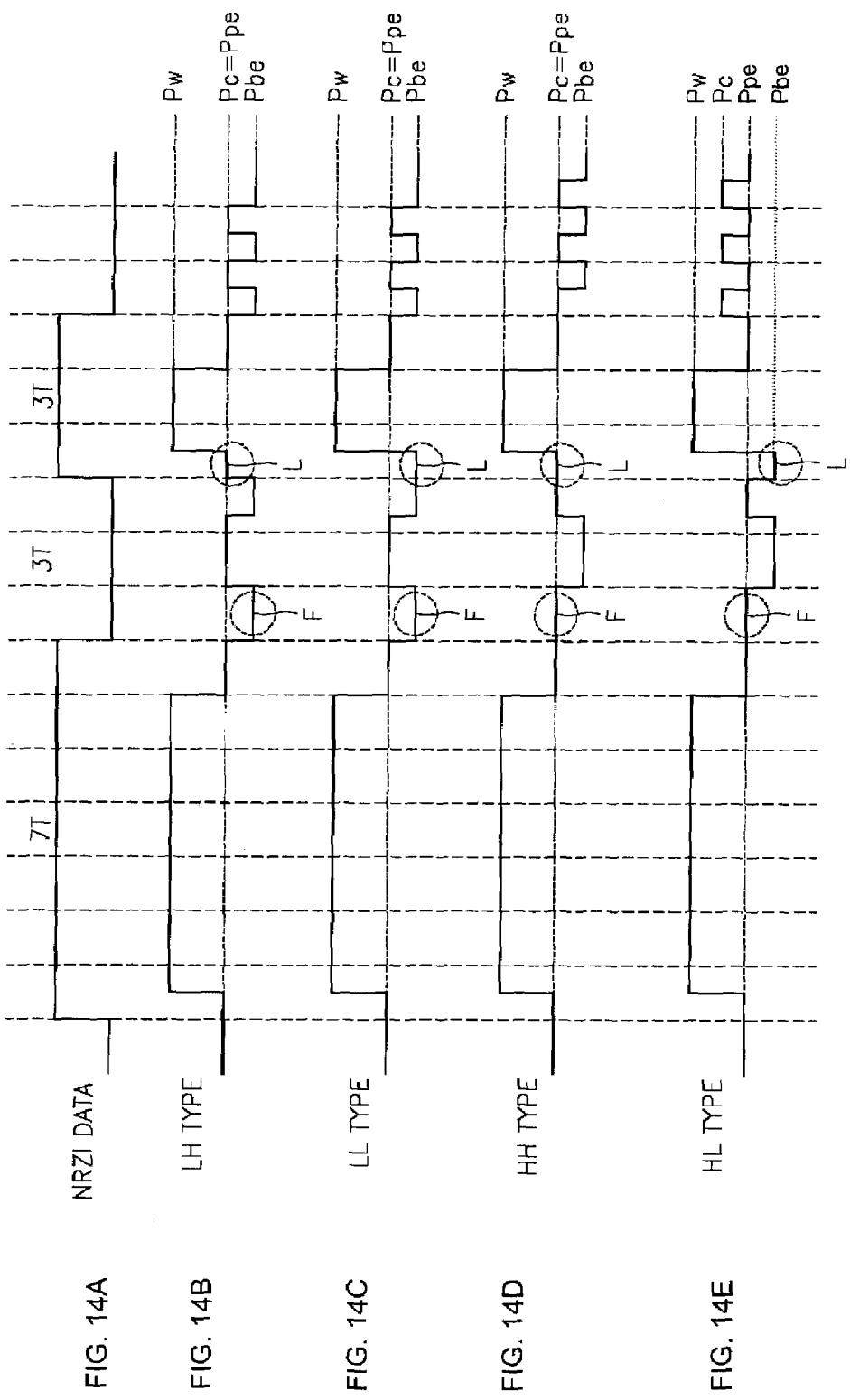

FIG. 3 is a block diagram illustrating the structure of the recording apparatus of FIG. 2 according to another embodiment of the present invention. Elements that are the same as those of FIG. 2 are indicated with the same reference numerals and their descriptions will be omitted here. The recording apparatus of FIG. 3 includes a pickup 1, a recording waveform generator 2, and a channel modulator 3. The pickup 1 includes a motor 11 that rotates the optical disc 200. An optical head 13 illuminates a laser beam on the optical disc 200 or receives the laser beam reflected from the optical disc 200. A servo circuit 12 performs servo control on the motor 11 and the optical head 13. A laser driving circuit 14 drives a laser (not shown) installed in the optical head 13 to emit the laser beam.

The channel modulator 3 creates non-return-to-zero-inverted (NRZI) data by modulating input data into the channel bit stream. The recording waveform generator 2 generates the recording waveform to record the NRZI data and provides the recording waveform to the laser driving circuit 14 included in the pickup 1. The laser driving circuit 14 forms a mark or a space on the optical disc 200 by controlling the laser using the received recording waveform.

FIGS. 4A through 4E show shows recording waveforms 1 through 3 for recording NRZI data, according to an embodiment of the present invention. These recording waveforms are generated by the recording waveform generator 2 of FIG. 2 or 3. The NRZI data varies according to the type of a modulating method adopted by the channel modulator 3. For instance, the minimum and maximum lengths of a mark are 3 T and 11 T when input data is modulated using run length limited (RLL) (2, 10) encoding which includes eight-to-fourteen modulation (EFM), eight-to-fourteen modulation plus (EFM+), D(8-15), and dual modulation.

Here, D(8-15) is a modulation technique introduced in a report titled "Optical Disc Recording System of 25 GB Capacity" in Optical Data Storage (ODS) which was presented by Matsushita Electrics Co., Ltd. in 2001, the disclosure of which are incorporated by reference. The dual modulation is disclosed in Korean Patent Application No. 99-42032 entitled "Method of Arranging Improved RLL Code Capable of Suppressing DC, Modulating and Demodulating Method, and Modulator", filed 30 Sep. 1999 and published 25 Nov. 2000 by the same applicant of the present application, and in corresponding U.S. Pat. No. 6,281,815, the disclosures of which are incorporated herein by reference. When data is recorded using RLL (1, 7) encoding, the minimum and maximum lengths of a mark are 2 T and 8 T.

The recording waveforms 1, 2, and 3 shown in FIGS. 4C through 4E are examples of a recording waveform that includes a DC record pattern, and an erase pattern with a multi pulse. Each DC record pattern includes a first pulse $T_{fp}$ with a different power level Ppe or Pbe than power levels of the remaining pulses, a second pulse $T_{sp}$, a DC pulse $T_{dc}$, and a cooling pulse $T_{cl}$, which are sequentially generated. Here, $T_{fp}$, $T_{sp}$, $T_{dc}$, and $T_{cl}$ denote the pulse duration of the first, second, DC, and cooling pulses, respectively. During recording of a mark having a 7 T duration, the DC pulse is maintained at a power level Pw2 for more than 4 T. The power level Pw2 of the DC pulse $T_{dc}$ is higher than the power level Ppe or Pbe of the first pulse $T_{fp}$, but is lower than the power level Pw1 of the second pulse $T_{sp}$. The power level Pb of the cooling pulse $T_{cl}$ is lower than the power level Ppe or Pbe of the first pulse $T_{fp}$. The power level Ppe of the first pulse $T_{fp}$ of the recording waveform 1 shown in FIG. 4C is the same as high power level Ppe of a multi pulse, which will be later described. The power level Pbe of the first pulses $T_{fp}$ of the recording waveforms 2 and 3 shown in FIGS. 4D and 4E are the same as the low power level Pbe of the multi pulse.

Each erase pattern includes a multi pulse. In FIGS. 4C through 4E, $T_{emp}$ denotes the width of each erase multi pulse that make up the erase pattern. In this embodiment, $T_{emp}$ is set to 0.5 T. The power level Ppe of the first and last erase pulses F and L shown in FIG. 4C, which constitute the multi pulse of the recording waveform 1, are the same as high power level Ppe of the multi pulse. The power level Pbe of the first and last erase pulses F and L shown in FIGS. 4D and 4E, which constitute the multi pulses of the recording waveforms 2 and 3, are the same as low power level Pbe of the multi pulse. Each last pulse L is also the first pulse of each of the recording waveforms 1 through 3 for recording a mark having the 3 T duration that follows the multi pulse. The multi pulse of the erase pattern of the recording waveform 2 in FIG. 4D has a different power from the power level Ppe of the erase pattern of the recording waveform 3 in FIG. 4E.

FIGS. 5A through 5E illustrate recording waveforms 4 through 6 for recording NRZI data according to additional embodiments of the present invention. These recording waveforms are generated by the recording waveform generator 2 in FIG. 2. The recording waveforms 4, 5, and 6 show different DC record patterns. Each DC record pattern includes a first pulse $T_{fp}$ with a different power level Ppe or Pbe than power levels of the remaining pulses, a DC pulse $T_{dc}$, a last pulse $T_{lp}$, and a cooling pulse $T_{cl}$ which are sequentially generated. Here, $T_{fp}$, $T_{dc}$, $T_{lp}$, and $T_{cl}$ denote the pulse duration of the first pulse, the DC pulse, the last pulse, and the cooling pulse, respectively.

During recording of a mark of 7 T duration, the DC pulse $T_{dc}$ is maintained at a power level Pw2 for more than 4 T. Also, the power level Pw2 of the DC pulse $T_{dc}$ is higher than the power level Ppe or Pbe of the first pulse $T_{fp}$, but is lower than the power level Pw1 of the last pulse $T_{lp}$. The power level Pb of the cooling pulse $T_{cl}$ is lower than the power level Ppe or Pbe of the first pulse $T_{fp}$. During recording of a mark of 3 T duration, the power level Pw2 of the last pulse $T_{lp}$ of a multi pulse is higher than the power level Ppe or Pbe of the first pulse $T_{fp}$, but is lower than the power level Pw1 of the DC pulse $T_{dc}$. The power level Ppe of the first pulse $T_{fp}$ of the recording waveform 4 shown in FIG. 5C is the same as the high power level Ppe of the multi pulse, which will be later described. The power level Pbe of the first pulses $T_{fp}$ of the recording waveforms 5 and 6 shown in FIGS. 5D and 5E are the same as the low power level Pbe of the multi pulse.

Each erase pattern includes a multi pulse. In FIGS. 5C through 5E, $T_{emp}$ denotes the width of each erase multi pulse which constitutes the erase pattern. In this embodiment, $T_{emp}$ is set to 0.5 T. The power level Ppe of the first and last erase pulses F and L, which constitute the multi pulse of the recording waveform 4 shown in FIG. 5C, are the same as the high power level Ppe of the multi pulse. The power level Pbe of first and last erase pulses F and L, which constitute the multi pulses of the recording waveforms 5 and 6 shown in FIGS. 5D and 5E, are the same as the low power level Pbe of the multi pulses. The last pulse L is also the first pulse of each of the recording waveforms 4 through 6 for recording a mark of 3 T duration that follows the multi pulse. The multi pulse of the erase pattern of the recording waveform 5 shown in FIG. 5D has a different power level Ppe from the power level Ppe of the erase pattern of the recording waveform 6 shown in FIG. 5E.

FIGS. 6A through 6E show recording waveforms 7 through 9 for recording NRZI data, according to still additional embodiments of the present invention. These recording waveforms are generated by the recording waveform generator 2 of FIG. 2. Referring to FIGS. 6A through 6E, the recording waveforms 7 through 9 illustrate different DC record patterns. Each DC record pattern includes a first pulse $T_{fp}$ with a different power level Ppe or Pbe than power levels of the remaining pulses, a DC pulse $T_{dc}$, a last pulse $T_{lp}$, and a cooling pulse $T_{cl}$, which are sequentially generated. Here, $T_{fp}$, $T_{dc}$, $T_{lp}$, and $T_{cl}$ denote the pulse duration of the first pulse, the DC pulse, the last pulse, and the cooling pulse, respectively.

During recording a mark of 7 T duration, the DC pulse $T_{dc}$ is maintained at a power level Pw2 for more than 4 T. Also, the power level Pw2 of the DC pulse $T_{dc}$ is higher than the power level Ppe or Pbe of the first pulse $T_{fp}$, but is lower than the power level Pw1 of the last pulse $T_{lp}$. Also, the power level Pbe of the cooling pulse $T_{cl}$, is at or below the power level Ppe or Pbe of the first pulse $T_{fp}$. During recording of a mark of 3 T duration, the power level Pw2 of the last pulse $T_{lp}$, is higher than the power level Ppe or Pbe of the first pulse $T_{fp}$ but is lower than the power level Pw1 of the DC pulse $T_{dc}$. The power level Ppe of the first pulse $T_{fp}$ of the recording waveform 7 shown in FIG. 6C is the same as the high power level Ppe of a multi pulse, which will be later described. The power level Pbe of the first pulses $T_{fp}$ of the recording waveforms 8 and 9 shown in FIGS. 6D and 6E is the same as low power level Pbe of the multi pulse.

Each erase pattern includes a multi pulse. Here, $T_{emp}$ denotes the width of each erase multi pulse which make up the erase pattern. In this embodiment, the $T_{emp}$ is set to 0.5

T. The power level Ppe of the first and last erase pulses F and L, which constitute the multi pulse of the recording waveform 7 shown in FIG. 6C is the same as the high power level Ppe. The power level Pbe of the first and last erase pulses F and L, which constitute the multi pulses of the recording waveforms 8 and 9 shown in FIGS. 6D and 6E is the same as the low power level Pbe. The last pulse L is also the first pulse of each of the recording waveforms 7 through 9 for recording the mark of 3 T duration that follows the multi pulse. The multi pulse of the erase pattern of the recording waveform 8 shown in FIG. 6D has a different power level Ppe from the power level Ppe of the erase pattern of the recording waveform 9 shown in FIG. 6E.

FIGS. 7A through 8E illustrate recording waveforms 10 through 12 and 13 through 15 for recording NRZI data according to yet still additional embodiments of the present invention. These DC recording waveforms are generated by the recording waveform generator 2 shown in FIG. 2. The recording waveforms 10 through 15 illustrate different DC record patterns according to embodiments of the present invention.

Each DC record patterns includes a first pulse $T_{fp}$ with a different power level Ppe or Pbe than power levels of the remaining pulses, a second pulse $T_{sp}$, a DC pulse $T_{dc}$, a last pulse $T_{lp}$, and a cooling pulses $T_{cl}$, which are sequentially generated. Here, $T_{fp}$, $T_{sp}$, $T_{dc}$, $T_{lp}$, and $T_{cl}$ denote the pulse duration of the first pulse, the second pulse, the DC pulse, the last pulse, and the cooling pulse, respectively. The power level Pw1 of the second and last pulses $T_{sp}$ and $T_{lp}$ is the same, but the power levels Pw2 and Pb or Pbe of the other pulses is different. The last pulse $T_{lp}$ is not included in each of the DC record patterns for recording a mark of 3 T.

During recording of a mark of 7 T duration, the DC pulse $T_{dc}$ is maintained at a power level Pw2 for more than 4 T Also, the power level Pw2 of the DC pulse $T_{dc}$ is higher than the power level Ppe or Pbe of the first pulse $T_{fp}$, but is at or below the power level Pw1 of the last pulse $T_{lp}$. Also, the power level Pb or Pbe of the cooling pulse $T_{cl}$ is lower than the power level Ppe or Pbe of the first pulse $T_{fp}$. During recording of a mark of 3 T duration, the power level Pw2 of the DC pulse $T_{dc}$ is higher than the power level Ppe or Pbe of the first pulse $T_{fp}$, but is lower than the power level Pw1 of the second pulse $T_{sp}$. The power level Ppe of the first pulses $T_{sp}$ of the recording waveforms 10 and 13 shown in FIGS. 7C and 8C is the same as high power level Ppe of a multi pulse, which will be later described. The power level Pbe of the first pulse $T_{fp}$ of the recording waveforms 11, 12, 14, and 15 shown in FIGS. 7D, 7E, 8D, 8E is the same as low power level Pbe of the multi pulse. Also, the power level Pbe of the cooling pulses $T_{cl}$ of the recording waveforms 13, 14, and 15 shown in FIGS. 8C, 8D, and 8E is the same as the low power level Pbe of the multi pulse.

Meanwhile, each erase pattern includes a multi pulse. Here, $T_{emp}$ denotes the width of each erase multi pulses which constitute the erase pattern. In this embodiment, $T_{emp}$ is set to 0.5 T. The power level Ppe of the first and last erase pulses F and L, which constitute the multi pulse of the recording waveforms 10 and 13, is the same as the high power level Ppe of the multi pulse. The power level Pbe of the first and the last erase pulses F and L, which constitute the multi pulses of the recording waveforms 11, 12, 14 and 15 shown in FIGS. 7D, 7E, 8D, 8E, is the same as the low power level Pbe of the multi pulse. The last pulse L is also the first pulse of each of the recording waveforms 10 through 15 shown in FIGS. 7C through 8E for recording a mark of 3 T that follows the multi pulse.

FIGS. 9A through 9E illustrate recording waveforms 16 through 18 for recording NRZI data, according to still yet additional embodiments of the present invention. These recording waveforms are generated by the recording waveform generator 2 of FIG. 2. The recording waveforms 16 through 18 illustrate different DC record patterns.

Each DC record pattern includes a first pulse $T_{fp}$ with a different power level Ppe or Pbe than power levels of the remaining pulses, a second pulse $T_{sp}$, a DC pulse $T_{sp}$, a last pulse $T_{lp}$, and a cooling pulse $T_{cl}$, which are sequentially generated. Here, $T_{fp}$, $T_{sp}$, $T_{dc}$, $T_{lp}$, and $T_{cl}$ denote the pulse duration of the first pulse, the second pulse, the DC pulse, the last pulse, and the cooling pulse, respectively. Here, the power level Pw1 of the DC pulse $T_{dc}$ is higher than the power level Ppe or Pbe of the first pulse $T_{fp}$. The power level Pb of the cooling pulse $T_{cl}$ is lower than the power level Ppe or Pbe of the first pulse $T_{fp}$.

The DC pulse $T_{dc}$ is maintained at a power level Pw1 for more than 5 T during recording of a mark of 7 T and maintained for more than a mark of 1 T during recording of a mark of 3 T. The power level Ppe of the first pulse $T_{fp}$ of the recording waveform 16 shown in FIG. 9C is the same as the high power level Ppe of a multi pulse, which will be later described. The power level Pbe of the first pulses $T_{fp}$ of the recording waveforms 17 and 18 shown in FIGS. 9d and 9E is the same as the low power level Pbe of the multi pulse.

Each erase pattern includes a multi pulse. Here, $T_{emp}$ denotes the width of each erase multi pulse which constitutes the erase pattern. In this embodiment, the $T_{emp}$ is set to 0.5 T. The power level Ppe of the first and last erase pulses F and L, which constitute the multi pulse of the recording waveform 16 shown in FIG. 9C, is the same as the high power level Ppe of the multi pulse. The power level Pbe of the first and last erase pulses F and L, which constitute the multi pulses of the recording waveforms 17 and 18 shown in FIGS. 9D and 9E, is the same as the low power level Pbe of the multi pulse. The last pulse L is also the first pulse of each of the recording waveforms 16 through 18 for recording a mark of 3 T that follows the multi pulse.

FIGS. 10A through 10E illustrate recording waveforms 19 through 21 for recording NRZI data according to still additional embodiments of the present invention. These recording waveforms are generated by the recording waveform generator 2 in FIG. 2. The recording waveforms 19 through 21 illustrate different erase patterns. Each DC record pattern includes a first pulse $T_{fp}$ with a different power level Ppe or Pbe than power levels of the remaining pulses, a second pulse $T_{sp}$, a DC pulse $T_{dc}$, and a cooling pulse $T_{cl}$, which are sequentially generated. Here, $T_{fp}$, $T_{sp}$, $T_{dc}$, and $T_{cl}$ denote the pulse duration of the first pulse, the second pulse, the DC pulse, and the cooling pulse, respectively.

The DC pulse $T_{dc}$ is maintained at a power level Pw2 for more than 4 T during recording of a mark of 7 T duration. The power level Pw2 of the DC pulse $T_{dc}$ of each recording waveform is higher than the power level Ppe or Pbe of the first pulse $T_{fp}$, but is lower than the power level Pw1 of the second pulse $T_{sp}$. Also, the power level Pb of the cooling pulse $T_{cl}$ is lower than the power level Ppe or Pbe of the first pulse $T_{fp}$. However, the power level Ppe of the first pulse $T_{fp}$ of the recording waveform 19 shown in FIG. 10C is the same as high power level Ppe of a multi pulse, which will be later described. The power levels Ppe, Pbe of the first pulse $T_{fp}$ of the recording waveforms 20 and 21 in FIGS. 10D and 10E are the same as the corresponding power levels Ppe, Pbe of the multi pulse Each erase pattern includes a modified multi pulse. The modified multi pulse is obtained by making the pulse durations of respective unit pulses be different from one another. The power level Pbe of the first and last erase pulses F and L, which constitute the multi pulse of the recording waveform 19 in FIG. 10C, is the same as high power level Ppe of the multi pulse. The power level Pbe of the first and last pulses F and L, which constitute the multi pulses of the recording waveforms 20 and 21 in FIGS. 10D and 10E, is the same as low power level Pbe of the multi pulse. The last pulse L is also the first pulse of each of the recording waveforms 19 through 21 for recording a mark of 3 T that follows the multi pulse.

FIGS. 11A through 11E show recording waveforms 22 through 24 generated by the recording waveform generator 2 of FIG. 2 according to still additional embodiments of the present invention. Referring to FIGS. 11A through 11E, the recording waveforms 22 through 24 illustrate different erase patterns.

Each DC record pattern includes a first pulse $T_{fp}$ with a different power level Ppe or Pbe than power levels of the remaining pulses, a DC pulse $T_{dc}$, and a cooling pulse $T_{cl}$, which are sequentially generated. Here, $T_{fp}$, $T_{dc}$, and $T_{cl}$ denote the pulse duration of the first pulse, the DC pulse, and the cooling pulse, respectively. The DC pulse $T_{dc}$ is maintained for more than 5 T when recording a mark of 7 T duration and maintained for more than 1 T when recording a mark of 3 T duration. The power level Pw of the DC pulse $T_{dc}$ is higher than the power level Ppe or Pbe of the first pulse $T_{fp}$. The power level Pc of the cooling pulse $T_{cl}$ is lower than the power level Ppe or Pbe of the first pulse $T_{fp}$. Also, the power levels Ppe, Pbe of the first pulses $T_{fp}$ of the recording waveforms 22 through 24 are the same as the corresponding high power levels Ppe, Pbe of modified multi pulses which will be later described in detail.

Each erase pattern includes a modified multi pulse. The modified multi pulse is obtained by make the pulse duration of unit pulses be different from one another. The first and last erase pulses F and L of the modified multi pulse of each of the recording waveforms 22 through 24 shown in FIGS. 11C through 11E are at low and high power levels Pbe, Ppe, respectively. Each last erase pulse L is also the first pulse $T_{fp}$ of the record pattern for recording a mark of 3 T which follows the multi pulse.

FIGS. 12A through 12E show recording waveforms 25 through 27 generated by the recording waveform generator 2 of FIG. 2 according to additional embodiments of the present invention. Referring to FIGS. 12A through 12E, the recording waveforms 25 through 27 illustrate different DC record patterns.

In each record pattern, a first pulse $T_{fp}$, a modified DC pulse $T_{dc}$, and a cooling pulse $T_{cl}$ are sequentially generated during recording of a mark of 7 T duration. The power level Pw1 of the modified DC pulse $T_{dc}$ is maintained at a DC level for more than 1 T, and then is lowered to the power level Pb of the cooling pulse $T_{cl}$ for less than 1 T. Such a change in the power level of the modified DC pulse $T_{dc}$ is repeated a predetermined numbers of times. When recording a mark of 3 T duration, a first pulse $T_{fp}$, a DC pulse $T_{dc}$, and a cooling pulse $T_{cl}$ are sequentially generated. Here, $T_{fp}$, $T_{dc}$, and $T_{cl}$ denote the pulse duration of the first pulse, the modified DC pulse, and the cooling pulse, respectively.

Each erase pattern includes a multi pulse. In FIGS. 12C through 12E, $T_{emp}$ denotes the width of an erase multi pulse that constitutes the erase pattern. In this embodiment, $T_{emp}$ is set to 0.5 T The power level Ppe of the first and last erase pulses F and L of the multi pulse of the recording waveform 25 shown in FIG. 12C are at high power levels. The power level Pbe of the first and last erase pulses F and L of the multi pulses of the recording waveforms 26 and 27 shown in FIGS. 12D and 12E are at low power level Pbe. Each last erase pulse L is also the first pulse $T_{fp}$ of the record pattern for recording a mark of 3 T that follows the multi pulse.

FIGS. 13A through 13E illustrate recording waveforms 28 through 30 generated by the recording waveform generator 2 of FIG. 2, according to still additional embodiments of the present invention. The recording waveforms 28 through 30 show different DC record patterns.

In a record pattern for recording a mark of 7 T duration, a first pulse $T_{fp}$, a modified DC pulse $T_{dc}$, and a cooling pulse $T_{cl}$ are sequentially generated. The power level Pw1 of the modified DC pulse $T_{dc}$ is maintained at a DC level for more than 1 T, and is reduced to the power level Pb of the cooling pulse $T_{cl}$ for less than 1 T. Such a change in the power level of the modified DC pulse $T_{dc}$ is repeated predetermined numbers of times. In a record pattern for recording the next mark of 3 T duration, a first pulse $T_{fp}$, a DC pulse $T_{dc}$, and a cooling pulse $T_{cl}$ are sequentially generated. Here, $T_{fp}$, $T_{dc}$, and $T_{cl}$ denote the pulse duration of the first, DC, and cooling pulses, respectively.

Each erase pattern includes a modified multi pulse. The modified multi pulse is obtained by make the pulse duration of unit pulses be different from one another. The power level Ppe of the first and last erase pulses F and L, which constitute the modified multi pulse of the recording waveform 28 shown in FIG. 13C, are at high power level Ppe. In contrast, the power level Pbe of the first and last erase pulses F and L which constitute the modified multi pulses of the recording waveforms 29 and 30 of FIGS. 13D and 13E, are at low power level Pbe and high power level Ppe, respectively. Each last erase pulse L is also the first pulse $T_{fp}$ of the record pattern for recording the mark of 3 T that follows the modified multi pulse.

FIGS. 14A through 16E illustrate recording waveforms showing four types of erase patterns according to further embodiments of the present invention. The characteristic portions of the respective erase patterns are marked with circles in order to more easily distinguish them from one another.

Referring to FIGS. 14A through 16E, the erase patterns include modified multi pulses classified into four types: LH type; LL type; HH type; and HL type. In detail, FIGS. 14B, 15B, 16B show an erase pattern of the LH type, in which the first erase pulse F of which is at a low power level Pbe and the last erase pulse L of which is at a high power level Ppe. FIGS. 14C, 15C, 16C show an erase pattern of the LL type, in which the first and last erase pulses F and L of which are at low power level Pbe. FIGS. 14D, 15D, 16D show an erase pattern of the HH type, in which the first and last erase pulses F and L of which are at high power level Ppe. FIGS. 14E, 15E, 16E show an erase pattern of the HL type, in which the first erase pulse F of which is at a high power level Ppe and the last erase pulse L of which is at a low power level Pbe.

The duration of the high and low power levels Ppe, Pbe of a multi pulse of an erase pattern according to the present invention is set to 0.5 T. That is, a ratio of the duration of the high power level to that of the low power level is 1:1. However, it is understood that there is no limit to the ratio. For example, the ratio may be expressed as m:n (m and n are integers)

As described above, a recording waveform according to the present invention includes an erase pattern including a multi pulse, thereby reducing the distortion of an end of a mark and increasing the reproducing characteristics. The recording waveform further includes a DC record pattern with a DC pulse, which prevents a reduction in power supplied when recording data a high speed and improves the shape of a mark by more easily controlling recording operations.

Meanwhile, information (or type information) regarding four types of erase patterns may be recorded in a lead-in area of a writable disc or contained as header information in a wobble signal. Therefore, when recording data on a writable disc, a recording apparatus reads the type information from a lead-in area or a wobble signal, and forms a mark or a space on the disc by generating a recording waveform based on the read type information.

The four types of the erase patterns may be used as codes indicating a reading speed factor of a disc drive or the type of a mark according to another aspect of the invention. For instance, an LH-type erase pattern may indicate that information recorded on a disc using the erase pattern is preferably reproduced at a 20× speed factor.

Figure 17:
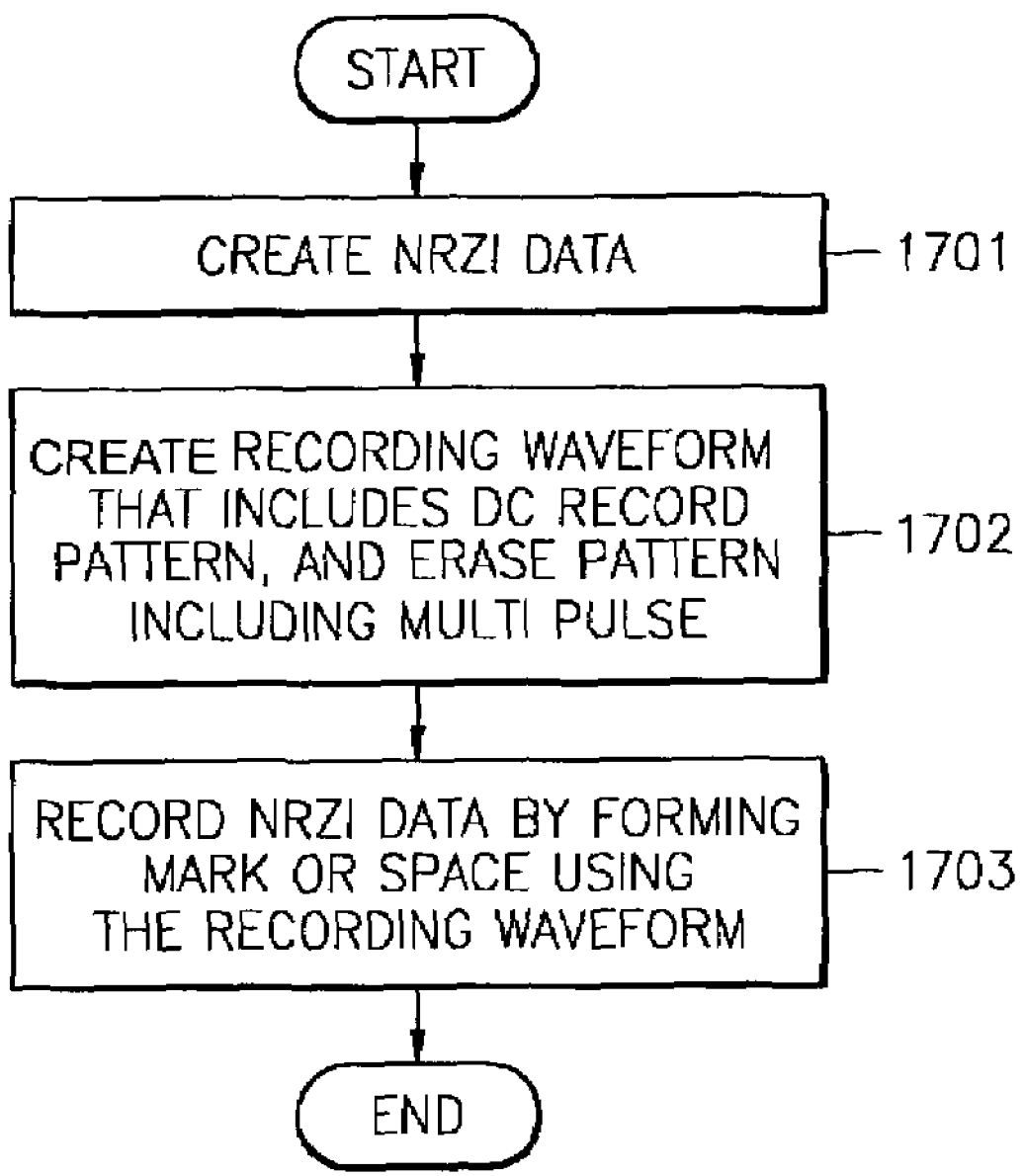
FIG. 17 is a flowchart illustrating a recording method according to an embodiment of the present invention.

Hereinafter, a method of recording channel-modulated digital data on an optical disc by forming marks and spaces thereon according to an embodiment of the present invention will be described based on the above configuration. FIG. 17 is a flowchart illustrating a recording method according to an embodiment of the present invention. Referring to FIG. 17, the recording apparatus shown in FIG. 2 receives and modulates external data to produce NRZI data (in operation 1701). In operation 1702, the recording apparatus creates a recording waveform that includes a DC record pattern, and creates an erase pattern with a multi pulse. In operation 1703, the recording apparatus forms a mark or a space on an optical disc using the recording waveform. While not required, it is understood that the method of FIG. 17 can be implemented as computer software implemented using a computer.

In this disclosure, the aforementioned recording waveforms are described with respect to marks of 7 T and 3 T durations. However, those skilled in the art could have easily derived a record pattern and an erase pattern for marks or spaces of 2 T, 4 T, 5 T, or 6 T, from the teachings of the present invention.

As described above, the present invention provides a recording apparatus and method for recording a recording waveform that prevents the distortion of a mark due to thermal interference or accumulation between adjacent marks and improves the shape of a mark. According to the present invention, the shape of a mark is hardly distorted even when recording data at a high speed, thereby increasing reading/reproducing characteristics.

While this invention has been particularly shown and described with reference to embodiments thereof, it will be understood by those skilled in the art that various changes in form and details may be made therein without departing from the spirit and scope of the invention as defined by the accompanying claims and equivalents thereof.

What is claimed is:

1. A method of recording data on an optical recording medium, comprising:
    forming a mark or a space using a recording waveform which includes a record pattern and an erase pattern,
    wherein the record pattern includes multiple pulses of different power levels for forming the mark, the multiple pulses including a first pulse, a second pulse having a higher power level than a power level of the first pulse, a third pulse having a power level between the power level of the first pulse and the power level of the second pulse, and a cooling pulse having a lower power level than the power level of the first pulse,
    wherein a duration of the third pulse is determined by a length of the mark, wherein the erase pattern includes multiple pulses of different power levels, including a high power level and a low power level for forming the space, and
    wherein a power level of the first pulse in the record pattern is one of the high power level and the low power level of the multiple pulses in the erase pattern, and a power level of a first pulse of the erase pattern is the high power level or the low power level of the multiple pulses of the erase pattern, and a power level of a last pulse of the erase pattern is the high power level or the low power level of the multiple pulses of the erase pattern.

2. The method of claim 1, wherein the forming the mark or the space comprises recording data using run length limited (RLL) (2,10) encoding.

3. The method of claim 1, wherein the forming the mark or the space comprises recording a first level and a second level of non-return-to-zero-inverted (NRZI) data as a mark and a space, respectively.

4. The method of claim 1, wherein
    power levels of two of the multiple pulses within the erase pattern define the multiple pulses as being one of multiple types of multiple pulses.

5. The method of claim 4, wherein information on the type of the multiple pulses of the erase pattern is written in a lead-in area of the optical recording medium or as header information of a wobble signal.

6. The method of claim 5, wherein the type of the multiple pulses of the erase pattern further indicates a recording speed for the optical recording medium.

7. The method of claim 1, wherein a power level of the third pulse in the record pattern is higher than the high power level of the multiple pulses in the erase pattern.

8. A method of recording data on an optical recording medium, comprising:
    producing channel-modulated digital data;
    producing a recording waveform for the channel-modulated digital data which comprises a record pattern and an erase pattern; and
    forming a first level and a second level of the channel-modulated digital data as a mark and a space on the optical recording medium using the recording waveform, respectively,
    wherein the record pattern includes multiple pulses of different power levels for forming the mark, the multiple pulses including a first pulse, a second pulse having a higher power level than a power level of the first pulse, a third pulse having a power level between the power level of the first pulse and the power level of the second pulse, and a cooling pulse having a lower power level than the power level of the first pulse,
    wherein a duration of the third pulse is determined by a length of the mark, wherein the erase pattern includes multiple pulses of different power levels, including a high power level and a lower power level, for forming the space, and
    wherein a power level of the first pulse in the record pattern is one of the high power level and the low power level of the multiple pulses in the erase pattern, and a power level of a first pulse of the erase pattern is the high power level or the low power level of the multiple pulses of the erase pattern, and a power level of a last pulse of the erase pattern is the high power level or the low power level of the multiple pulses of the erase pattern.

9. The method of claim 8, wherein a power level of the third pulse in the record pattern is higher than the high power level of the multiple pulses in the erase pattern.

10. A method of recording data on an optical recording medium, comprising:

producing channel-modulated digital data;

producing a recording waveform for the channel-modulated digital data which comprises a record pattern and an erase pattern; and forming a first level and a second level of the channel-modulated digital data as a mark and a space on the optical recording medium using the recording waveform, respectively, wherein the record pattern includes multiple pulses of different power levels for forming the mark, the multiple pulses including a first pulse, a second pulse having a higher power level than a power level of the first pulse, a third pulse having a power level between the power level of the first pulse and the power level of the second pulse, and a cooling pulse having a lower power level than the power level of the first pulse, wherein a duration of the third pulse is determined by a length of the mark, wherein the erase pattern includes modified multiple pulses of different power levels and different durations, including a high power level and a low power level, for forming the space, and wherein a power level of the first pulse in the record pattern is one of the high power level and the low power level of the modified multiple pulses in the erase pattern, and a power level of a first pulse of the erase pattern is the high power level or the low power level of the multiple pulses of the erase pattern, and a power level of a last pulse of the erase pattern is the high power level or the low power level of the multiple pulses of the erase pattern.

11. The method of claim 10, wherein a power level of the third pulse in the record pattern is higher than the high power level of the multiple pulses in the erase pattern.

12. A method of recording data on an optical recording medium, comprising:

producing channel-modulated digital data;

producing a recording waveform for the channel-modulated digital data which comprises a modified record pattern, and an erase pattern; and forming a first level and a second level of the channel-modulated digital data as a mark and a space on the optical recording medium using the recording waveform, respectively, wherein the modified record pattern includes multiple pulses of different power levels and different durations for forming the mark, the multiple pulses including a first pulse, a second pulse having a higher power level than a power level of the first pulse, a third pulse having a power level between the power level of the first pulse and the power level of the second pulse, and a cooling pulse having a lower power level than the power level of the first pulse, wherein a duration of the third pulse is determined by a length of the mark, wherein the erase pattern includes modified multiple pulses of different power levels and different durations, including a high power level and a low power level, for forming the space, and wherein a power level of the first pulse in the modified record pattern is one of the high power level and the low power level of the modified multiple pulses in the erase pattern and a power level of a first pulse of the erase pattern is the high power level or the low power level of the multiple pulses of the erase pattern, and a power level of a last pulse of the erase pattern is the high power level or the low power level of the multiple pulses of the erase pattern.

13. The method of claim 12, wherein a highest of the power levels of the multiple pulses of the modified record pattern is higher than a highest power level of the multiple pulses of the erase pattern.

14. The method of claim 12, wherein during the producing the channel-modulated digital data, the producing the recording waveform, and the forming the first level and the second level, run length limited (RLL) (2,10) encoding is used.

15. The method of claim 12, wherein during the producing the channel-modulated digital data, the producing the recording waveform, and the forming the first level and the second level, run length limited (RLL) (1,7) encoding is used.

16. The method of claim 12, wherein the power level of first and last pulses of the modified multiple pulses of the erase pattern is the same as a high power level of the modified multiple pulses.

17. The method of claim 12, wherein the power level of first and last pulses of the modified multiple pulses of the erase pattern is the same as a low power level of the modified multiple pulses.

18. The method of claim 12, wherein a duration of a high power level of the modified multiple pulses is a half of a clock period of a reference clock.

19. The method of claim 12, wherein the multiple pulses of the modified record pattern comprise, sequentially, the first pulse, the second pulse, the third pulse that is maintained at a predetermined power level, and the cooling pulse.

20. The method of claim 19, wherein a power level of the third pulse is maintained for more than four clock periods of a reference clock when recording a mark having seven clock periods.

21. The method of claim 19, wherein the first and second pulses and the cooling pulse are maintained for a half of the clock period, a clock period, and a clock period, respectively, when recording the mark having seven clock periods.

22. The method of claim 21, wherein the cooling pulse ends at an edge of corresponding non-return-to-zero-inverted (NRZI) data.

23. The method of claim 12, wherein a power level of the third pulse in the modified record pattern is higher than the high power level of the modified multiple pulses in the erase pattern.

24. An apparatus for recording data on an optical recording medium, comprising:

a recording waveform generator which generates, from data, a recording waveform that includes a record pattern or a modified record pattern, and an erase pattern; and a pickup having a light source which forms a mark or a space by illuminating a laser beam on the optical recording medium in accordance with the generated recording waveform so as to record the data, wherein the record pattern or the modified record pattern includes multiple pulses of different power levels and different durations for forming the mark, the multiple pulses including a first pulse, a second pulse having a higher power level than a power level of the first pulse, a third pulse having a power level between the power level of the first pulse and the power level of the second pulse, and a cooling pulse having a lower power level than the power level of the first pulse, wherein a duration of the third pulse is determined by a length of the mark, wherein the erase pattern includes multiple pulses or modified multiple pulses of different power levels and different durations, including a high power level and a low power level, for forming the space, and wherein a power level of the first pulse in the record pattern or the modified record pattern is one of the high power level and the low power level of the multiple pulses in the erase pattern, and a power level of a first pulse of the erase pattern is the high power level or the low power level of the multiple pulses of the erase pattern, and a power level of a last pulse of the erase pattern is the high power level or the low power level of the multiple pulses of the erase pattern.

25. The apparatus of claim 24, wherein a highest one of the power levels of the record pattern or the modified record pattern is higher than a highest power level of the erase pattern.

26. The apparatus of claim 24, further comprising a channel modulator which receives the data, modules a channel of the external data to produce NRZI data, and outputs the non-return-to-zero-inverted (NRZI) data to the recording waveform generator.

27. The apparatus of claim 24, wherein the pickup comprises:

a motor which rotates the optical recording medium;

an optical head which includes a laser which illuminates the laser beam on the optical recording medium and receive the laser beam reflected from the optical recording medium;

a servo circuit which performs servo control on the motor and the optical head; and a laser driving circuit which drives the laser installed in the optical head.

28. The apparatus of claim 24, wherein a power level of the third pulse in the record pattern or the modified record pattern is higher than the high power level of the multiple pulses or the modified multiple pulses in the erase pattern.

* * * * *